United States Patent [19]
Shimada

[11] Patent Number: 5,871,603
[45] Date of Patent: Feb. 16, 1999

[54] PNEUMATIC TIRES WITH ORGANIC OR INORGANIC FIBER CORD BEAD CORE

[75] Inventor: Takashi Shimada, Kodaira, Japan

[73] Assignee: Bridgestone Corporation, Tokyo, Japan

[21] Appl. No.: 907,863

[22] Filed: Aug. 11, 1997

[30] Foreign Application Priority Data

Aug. 12, 1996 [JP] Japan ..................................... 8-212563

[51] Int. Cl.$^6$ .................................................. B60C 15/04
[52] U.S. Cl. ............................................................ 152/540
[58] Field of Search ..................................... 152/540, 539; 57/902, 236, 237, 238, 240–242

[56] References Cited

U.S. PATENT DOCUMENTS

| | | | |
|---|---|---|---|
| 4,320,791 | 3/1982 | Fujii et al. | 152/540 |
| 4,787,200 | 11/1988 | Inada et al. | 57/902 |
| 4,832,102 | 5/1989 | Domchick . | |

FOREIGN PATENT DOCUMENTS

| | | |
|---|---|---|
| 0 329 590 A1 | 8/1989 | European Pat. Off. . |
| 0350718 | 1/1990 | European Pat. Off. . |
| 0416638 | 3/1991 | European Pat. Off. . |
| 0 655 351 A1 | 5/1995 | European Pat. Off. . |
| A-49-85705 | 8/1974 | Japan . |
| 6-278416 | 10/1994 | Japan ..................................... 152/540 |
| A-7-195917 | 8/1995 | Japan . |
| 8-300912 | 11/1996 | Japan ..................................... 152/540 |
| 2 102 745 | 2/1983 | United Kingdom . |
| 2261858 | 6/1993 | United Kingdom . |

OTHER PUBLICATIONS

Patent Abstracts of Japan, vol. 97, No. 007, Jul. 31, 1997 (JP 09 071110) (Yokohama Rubber Co., Mar. 18, 1997).
Patent Abstracts of Japan, vol. 95, No. 001, Feb. 28, 1995 (JP 06 278416) (Bridgestone Corp., Oct. 4, 1994).
European Search Report dated Feb. 9, 1998.

*Primary Examiner*—Adrienne Johnstone
*Attorney, Agent, or Firm*—Sughrue, Mion, Zinn, Macpeak & Seas, PLLC

[57] ABSTRACT

A pneumatic tire comprises a bead core formed by helically winding and spirally laminating an organic or inorganic fiber cord obtained by twisting an organic or inorganic fiber reinforcing element in one direction and then twisting at least two twisted fiber reinforcing elements in a direction opposite to the twisting direction of the fiber reinforcing element, in which the cord is formed by successively twisting so that the twisting number in the last twisting is made larger than the twisting number in the initial twisting and the twisting directions from the initial twisting to the last twisting are made different to each other.

5 Claims, 4 Drawing Sheets

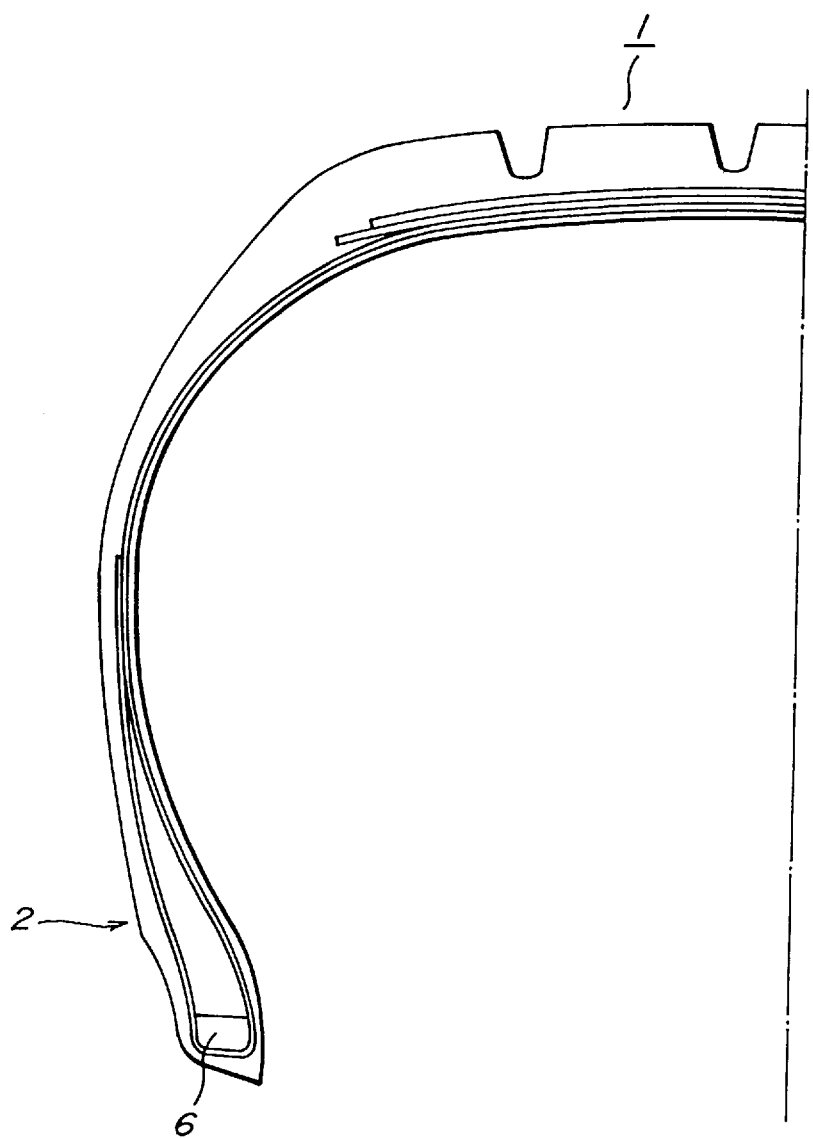

FIG_2
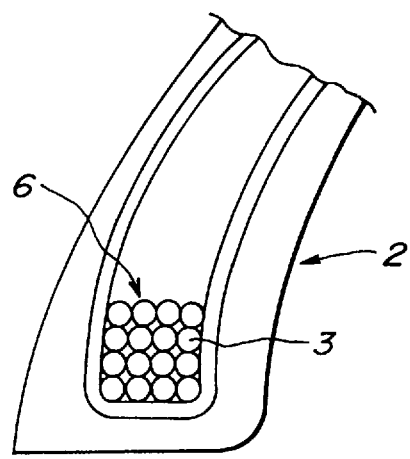
FIG_3
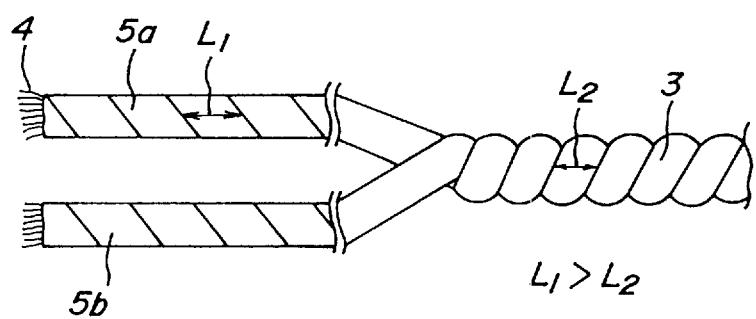

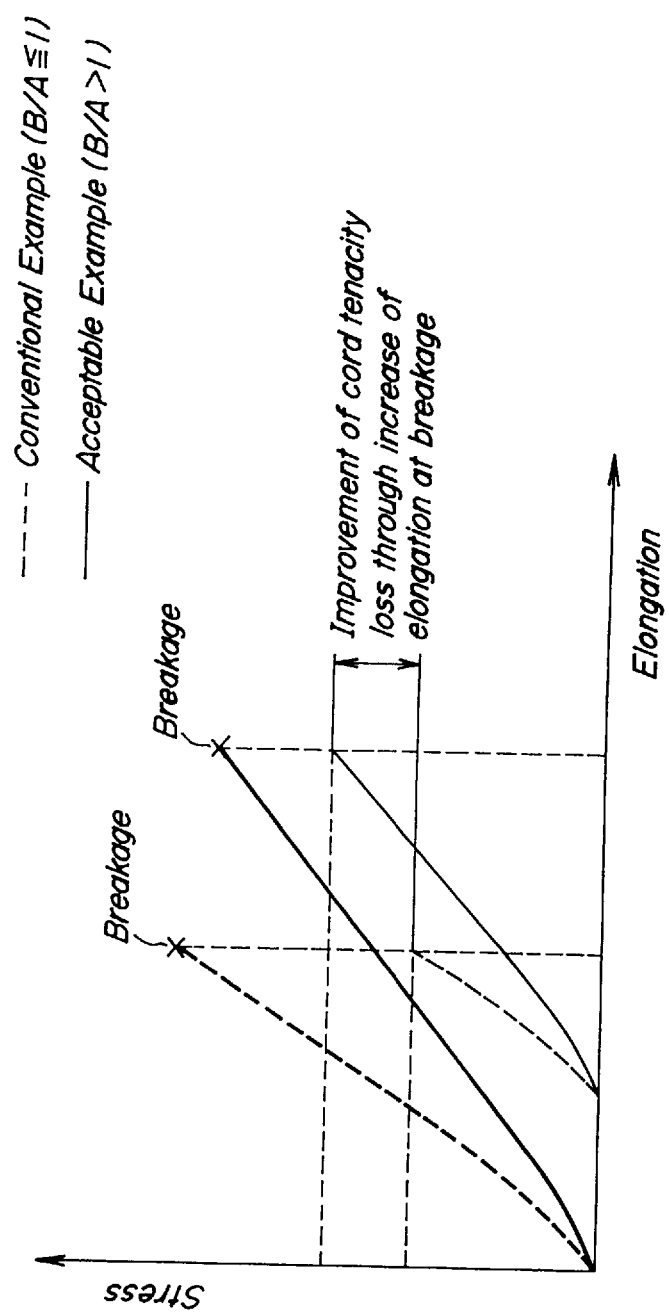

FIG_5a
FIG_5b
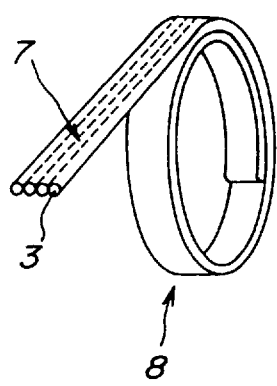
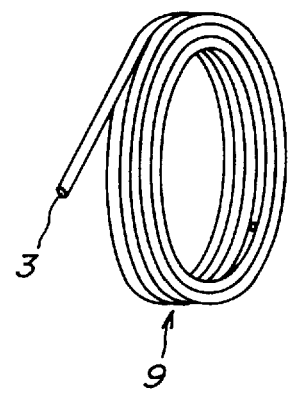

PNEUMATIC TIRES WITH ORGANIC OR INORGANIC FIBER CORD BEAD CORE

BACKGROUND OF THE INVENTION

1. Field of the Invention

This invention relates to a pneumatic tire, and more particularly to a pneumatic tire in which an organic or inorganic fiber cord usable for reducing a tire weight (weight reduction) is used as a cord constituting a bead core instead of steel cord. Also a critical inner pressure for tire burst apt to be lacking in case of using such a fiber cord is increased to a satisfactory level by appropriating a twisting method of the fiber cord.

2. Description of Related Art

Recently, it is increasingly demanded to attain low fuel consumption and the like in vehicles and hence it is strongly desired to reduce tire weight in accordance with the low fuel consumption of the vehicle.

In general, a bead portion of the tire is required to have a high rigidity because it plays a role of positioning and strongly holding the tire to a rim. For this end, a bead core used in the bead portion is usually made from a high-strength steel cord. From a viewpoint of the reduction of tire weight, there have recently developed so-called weight-reduced tires by using an organic or inorganic fiber cord, which is very light and relatively high in the tenacity, instead of the steel cord forming the bead core.

Up to the present, the tire provided with the bead core made from the above fiber cord cannot be put into practice unless a value of total bead tenacity represented by product of the cord winding number for the formation of the bead core and cord tenacity should be made large as compared with the tire provided with the bead core made from steel cord. This is done in order to render a critical inner pressure for burst as an indication for the judgment of safeness into the same level as the tire provided with the bead core made from steel cord.

It is considered that the difference of tensile properties between the steel cord and the fiber cord, particularly the difference of cord properties over a given period until the occurrence of cord breaking-up largely depends upon the critical inner pressure for burst.

In general, the bead core is formed by helically winding and spirally laminating the cord to form a cord arrangement of plural rows×columns. In order to simulate the critical inner pressure for burst in the bead core having such a cord arrangement, when stress distribution in a section of the bead core is investigated by raising an inner pressure of the tire, there is a tendency that stress usually concentrates in the cords located at an innermost row of the bead core in a radial direction of the tire. Hence, the stress distribution in the section of the bead core becomes ununiform.

In case of the bead core made from the steel cord, even if a large stress is applied to steel cords located at the innermost row of the bead core in the radial direction of the tire other than steel cords of the other rows as mentioned above, these steel cords of the innermost row plastically deform while creating a constriction or the like over a constant period until the occurrence of cord breaking-up and are further elongated while causing the plastic deformation without immediately causing the cord breaking-up even at the arrival to their cord tenacity. Thus it is possible to impose stress on steel cords located at the remaining rows of the bead core. As a result, the non-uniform distribution of stress in the section of the bead core is corrected to promote the uniformization of stress and hence stress tends to rise at the breakage of the bead core. Therefore, it is considered that when the bead core is made from the steel cord, the critical inner pressure for burst can be maintained at a high level even if the value of the total bead tenacity is decreased to a certain small level.

On the other hand, when the conventional organic fiber cords not attaining to the appropriation of the cord structure are applied to the bead core, such cords merely indicate even elongation against stress until the occurrence of the cord breaking-up but do not have tensile properties as in the aforementioned steel cord. Therefore, when a large stress is applied to the fiber cords located at the innermost row of the bead core in the radial direction of the tire other than fiber cords of the other rows, it is impossible to sufficiently impose stress to the fiber cords of the other remaining rows over a constant period until the occurrence of cord breaking-up as in the steel cord and hence the non-uniform distribution of stress in the section of the bead core is not corrected and there is not caused the same action of enhancing stress in the breakage of the bead core as in the steel cord. For this end, it is considered that the critical inner pressure for burst can not be maintained at a higher level unless the total bead tenacity in the bead core made from the fiber cords is increased to a certain high level.

In the conventional tire using the bead cord made from the fiber cord, the value of the total bead tenacity should be made large only by increasing the winding number of the fiber cord in order to render the critical inner pressure for burst into the same level as in the tire using the bead core made from the steel cord. However, the increase of the winding number of the fiber cord undesirably brings about the increase of tire weight and the rise of the production cost.

SUMMARY OF THE INVENTION

The inventor has made various studies in order to provide the critical inner pressure for burst at the same level as in the tire using the bead core made from the steel cord by increasing the winding number of the fiber cord without increasing the value of the total bead tenacity and found the following knowledge.

That is, the inventor has repeated the study based on a technical idea that the critical inner pressure for burst can be enhanced by attempting the uniformization of stress distribution in the section of the bead core and constituting the bead core so to sufficiently impose stress to not only the cords located at the innermost row in the radial direction of the tire but also the cords of the other remaining rows and found out that the critical inner pressure for burst can largely be enhanced by attaining the appropriation of the structure in the fiber cord.

It is, therefore, an object of the invention to provide a pneumatic tire having a critical inner pressure for burst of the same level as in the tire using the bead core made from the steel cord by appropriating the structure of the organic or inorganic fiber cord to uniformize stress in the section of the bead core without increasing the total weight of the fiber cord used in the bead core.

According to the invention, there is the provision of in a pneumatic tire comprising a bead core formed by helically winding and spirally laminating an organic or inorganic fiber cord obtained by two or more twistings inclusive of a twisting of an organic or inorganic fiber reinforcing element comprised of a monofilament or a bundle of filaments in one direction and a twisting of at least two twisted fiber reinforcing elements in a direction opposite to the twisting direction of the fiber reinforcing element, an improvement wherein the cord is formed by successively conducting the twistings so that the twisting number in the last twisting is made larger than the twisting number in the initial twisting and the twisting directions from the initial twisting to the last twisting are made different to each other.

Furthermore, it is favorable that the fiber cord has a plied structure obtained by twisting the fiber reinforcing elements in S-twisting (cable twist) and Z-twisting (ply twist) two times.

And also, it is favorable that the bead core is formed by winding and spirally laminating a narrow-width rubberized sheet embedding a plurality of the fiber cords therein (parastrand structure), or by helically winding and spirally laminating a single fiber cord (monostrand structure). The latter case is advantageous in a point that a higher inner pressure for burst is obtained as compared with the former case.

Moreover, it is favorable that a polyamide fiber as an organic fiber or a glass fiber or carbon fiber as an inorganic fiber is used as the fiber reinforcing element.

BRIEF DESCRIPTION OF THE DRAWINGS

The invention will be described with reference to the accompanying drawings, wherein:

FIG. 1 is a diagrammatically left-half section view of an embodiment of the pneumatic tire according to the invention;

FIG. 2 is a diagrammatically enlarged section view of a bead portion in the pneumatic tire shown in FIG. 1;

FIG. 3 is a view illustrating a relation of twisting number between cable twist and ply twist in a fiber cord constituting a bead core;

FIG. 4 is a graph showing a relation between stress and elongation until the breakage of cord when a ratio of twisting number B in ply twist to twisting number in cable twist A is more than 1 or not more than 1;

FIG. 5a is a view illustrating a parastrand structure; and

FIG. 5b is a view illustrating a monostrand structure.

DESCRIPTION OF THE PREFERRED EMBODIMENTS

In FIG. 1 is shown a diagrammatically left-half section view of a typical embodiment of the pneumatic tire according to the invention, and a bead portion of the tire shown in FIG. 1 is enlarged-sectionally shown in FIG. 2. In these figures, numeral 1 is a pneumatic tire, numeral 2 a bead portion, numeral 3 an organic or inorganic fiber cord, numeral 4 a filament, numeral 5 a fiber reinforcing element, and numeral 6 a bead core.

That is, the pneumatic tire 1 of FIG. 1 comprises the bead portion 2 containing the bead core 6 formed by helically winding and spirally laminating the fiber cord 3.

The fiber cord 3 is obtained by two or more twistings inclusive of a twisting of a fiber reinforcing element 5a, 5b comprised of a monofilament or a bundle of filaments 4 as shown in FIG. 3 in one direction and a twisting of at least two twisted fiber reinforcing elements 5a, 5b in a direction opposite to the twisting direction of the fiber reinforcing element.

Preferably, the fiber reinforcing elements 5 are twisted two times as shown in FIG. 3. Concretely, the fiber cord 3 is favorable to have a plied structure formed by twisting the fiber reinforcing elements in S-twisting (cable twist) and Z-twisting (ply twist) two times from a viewpoint of the production cost. However, the cord may be formed by three or more twistings of the fiber reinforcing elements. In any case, the twisting number of the fiber reinforcing elements may optionally be selected if necessary.

A filament constituting the fiber reinforcing element 5 is favorably selected from materials being light in the weight as compared with steel and relatively high in the tenacity and relatively small in the change of tensile properties when the tire is heated for vulcanization (i.e. good thermal stability), which include polyamide fiber, glass fiber, carbon fiber and the like.

As the winding structure of the fiber reinforcing element in the bead core 6, there is favorably used a parastrand structure 8 formed by winding and spirally laminating a narrow-width rubberized sheet 7 embedding a plurality of the fiber cords 3 therein as shown in FIG. 5a, or a monostrand structure 9 formed by helically winding and spirally laminating a single fiber cord 3 as shown in FIG. 5b.

A main feature in the construction of the invention lies in that the bead core is constituted with the fiber cord formed by successively conducting the twistings so that the twisting number in the last twisting is made larger than the twisting number in the initial twisting and the twisting directions from the initial twisting to the last twisting are made different to each other.

The terms "initial twisting" and "last twisting" used herein mean cable twist and ply twist in case of the fiber cord having the plied structure formed by twisting the fiber reinforcing elements 5 in S-twisting (cable twist) and Z-twisting (ply twist) two times. However, in case of the fiber cord obtained by twisting the fiber reinforcing elements 5 three or more times, the initial twisting means a first twisting and the last twisting means a twisting at a final step.

The measurement of the twisting number is carried out according to a regulation of JIS L1017, and concretely the twisting number is measured per 10 cm. On the other hand, the twisting number is inversely proportional to the twisting pitch. That is, the feature that the twisting number in the last twisting is made larger than the twisting number in the initial twisting as defined in the invention means that when the twisting pitch in the initial twisting is $L_1$ and the twisting pitch in the last twisting is $L_2$ as shown in FIG. 3, the pitch $L_1$ is made larger than the pitch $L_2$.

In the conventional tires, it is generally common that the pitch in the initial twisting is made equal to the pitch in the last twisting or the twisting numbers between the initial twisting and the last twisting are the same.

For clarifying the effect of the pneumatic tire according to the invention, FIG. 4 shows a relation between stress and elongation applied to the fiber cord having the plied structure formed by twisting the fiber reinforcing elements two times when varying a ratio of twisting number B in the last twisting (ply twist) to twisting number A in the initial twisting (cable twist).

In FIG. 4, a solid line shows a condition where the ratio B/A is more than 1 and a broken line shows a condition that the ratio B/A is not more than 1, and also a thick line in the solid line and broken line shows a cord in a broken portion of a bead core and a thin line in the solid line and broken line shows a cord existing in portions other than the broken portion of the bead core.

As seen from the results of FIG. 4, when the tire comprising the bead core made from the fiber cord having the ratio B/A of more than 1 is compared with the tire comprising the bead core made from the fiber cord having the ratio B/A of not more than 1, the stress at break applied to the cord in the broken portion is substantially the same in both the tires, but the elongation at break considerably increases and hence the ratio of bearing stress by the cords existing in the remaining portions other than the broken portion over a constant period until the occurrence of the cord breaking-up is increased to make large a sum of stress born by the cords in the breakage of the bead core, whereby the critical inner pressure for burst can largely be enhanced.

In the pneumatic tire according to the invention, as shown in FIG. 4, the elongation at break is increased while controlling the lowering of stress at break to attain appropriation of the structure of the fiber cord to increase the ratio of bearing stress by the cords existing in the portions other than the broken portion of the bead core.

In FIG. 4, a starting point of stress-elongation curve in the cord having a small stress burden (cord existing in a portion other than the broken portion) can be represented by shifting the arbitrary elongation toward a higher level side when a starting point in the cord having a large stress burden (cord in the broken portion) is the origin.

When the ratio B/A is not more than 1, the stress at the cord breaking-up becomes large, but the elongation becomes small and the cord tenacity becomes small accompanied therewith, so that the critical inner pressure for burst can not be increased according to the structure of the bead core and rather tends to be small.

Furthermore, the degradation of the workability due to the return of the twisting is controlled by successively conducting the twisting so that the twisting directions from the initial twisting to the last twisting are made different to each other.

The following examples are given in illustration of the invention and are not intended as limitations thereof.

A pneumatic tire according to the invention is prepared and subjected to a burst test as mentioned below.

This test tire is a passenger car tire having a tire size of 175/70R13 and comprises a bead core formed under cord conditions shown in Table 1 (cord material, cord structure, cord arrangement, cord winding structure, cord winding number, twisting number and twisting direction).

In Example 4 of Table 1, numerical value of 4 as a cord winding number means that narrow-width rubberized sheet containing 4 cords therein is spirally wound 4 times for the formation of the bead core having a cord arrangement of 4×4.

Moreover, the invention is characterized only by the bead core used in the bead portion, so that the other tire structure is the same as in the conventional tire usually used.

That is, the carcass is comprised of a rubberized ply containing polyethylene terephthalate (PET) fiber reinforcing elements arranged in a radial direction of the tire, and the belt is comprised of two rubberized layers containing steel cords therein, the cords of which layers being crossed with each other at a cord angle of 24° with respect to an equatorial plane of the tire.

For the reference, the conventional tire usually using the bead core made from steel cord and two comparative tires having the twisting number ratio B/A of 1 or less than 1 are shown in Table 1 as Conventional Example and Comparative Examples 1 and 2.

As the burst test, a test of gradually introducing pressurized air into the tire until the occurrence of tire breakage is favorable because it well matches with the actual use state of the tire, but this method has problems in view of the safeness. In this example, the test is carried out by using hydraulic pressure instead of air pressure and a burst pressure (hydraulic pressure) is measured.

That is, water flows into the inside of the tire while gradually discharging air existing in the tire through an air discharge port formed in the tire or a rim to measure a hydraulic pressure (burst pressure) at the occurrence of cord breaking-up in the bead core.

In Table 1 are also shown the measured results on the burst pressure (hydraulic pressure), cord tenacity and elongation at cord breaking-up together with a calculated value of a ratio of burst pressure to total bead tenacity (product of cord numbers and cord tenacity in the section of the bead core). The utilization of the cord in the bead core (stress bearing ratio of cords in the bead core) is evaluated from the calculated value of the ratio of burst pressure to total cord tenacity.

The term "ratio of burst pressure to total cord tenacity" used herein shows a stress bearing ratio of cord as a whole. As the value of this ratio becomes large, the ununiform stress distribution in the section of the bead core is corrected to promote the uniformization of the stress distribution.

TABLE 1

|  | Conventional Example | Comparative Example 1 | Comparative Example 2 | Example 1 | Example 2 | Example 3 | Example 4 | Example 5 |
|---|---|---|---|---|---|---|---|---|
| Bead core |  |  |  |  |  |  |  |  |
| Cord material | steel | aramide fiber | aramide fiber | aramide fiber | aramide fiber | aramide fiber | aramide fiber | aramide fiber |
| Cord structure | φ0.96 mm | 6000d/2 | 6000d/2 | 6000d/2 | 6000d/2 | 3000d/4 | 6000d/2 | 3000d/2/2 |
| Cord arrangement (row × column) | 4 × 4 | 4 × 4 | 4 × 4 | 4 × 4 | 4 × 4 | 4 × 4 | 4 × 4 | 4 × 4 |
| Cord winding structure | parastrand structure | monostrand structure | monostrand structure | monostrand structure | monostrand structure | monostrand structure | parastrand structure | monostrand structure |
| Cord winding number (times) | — | 16 | 16 | 16 | 16 | 16 | 4 | 16 |
| Twisting number (cable/ply) | — | 8 × 8 | 14 × 8 | 8 × 14 | 8 × 16 | 8 × 14 | 8 × 14 | 8 × 8 × 14 |
| Twisting direction | — | ZS | ZS | ZS | ZS | ZS | ZS | ZSZ |
| Cord tenacity (kgf/cm$^2$) | 140 | 241 | 219 | 219 | 203 | 233 | 219 | 214 |
| Elongation of cord breaking-up (%) | 5.2 | 5.4 | 5.7 | 7.2 | 8.2 | 7.1 | 7.2 | 7.1 |

TABLE 1-continued

|  | Conventional Example | Comparative Example 1 | Comparative Example 2 | Example 1 | Example 2 | Example 3 | Example 4 | Example 5 |
|---|---|---|---|---|---|---|---|---|
| Burst pressure (kgf/cm$^2$) | 18.7 | 19.4 | 16.3 | 20.4 | 19.7 | 21.6 | 19.3 | 20.6 |
| Ratio of burst pressure/total bead tenacity (×10$^{-3}$) | 8.30 | 5.03 | 4.65 | 5.82 | 6.07 | 5.79 | 5.51 | 6.02 |

As seen from the results of Table 1, all of Examples 1–5 using the bead core made from aramide fiber cords have the same burst pressure as in the conventional example using the bead core made from steel cords and could reduce the tire weight by about 20–30% as compared with the conventional example.

As to the bead core having a monostrand structure as a cord winding structure, when Examples 1, 2, 3 and 5 are compared with Comparative Examples 1 and 2, all of these examples having a B/A ratio of more than 1 are large in the burst pressure and ratio of burst pressure to total bead tenacity as compared with the comparative examples having a B/A ratio of not more than 1.

In addition, the tire having a bead core of parastrand structure tends to become small in the burst pressure and ratio of burst pressure to total bead tenacity as compared with the tire having a bead core of monostrand structure. However, Example 4 using the bead core of parastrand structure is large in the ratio of burst pressure to total bead tenacity as compared with Comparative Example 1 using the bead core of monostrand structure.

As mentioned above, according to the invention, the fiber cord is obtained by successively conducting the twistings so that the twisting number in the last twisting is made larger than the twisting number in the initial twisting and the twisting directions from the initial twisting to the last twisting are made different to each other, whereby the stress distribution in the section of the bead core can be uniformized and hence it is possible to provide pneumatic tires having the same level of critical inner pressure for burst as in a tire using a bead core made from steel cord without increasing the value of total bead tenacity, or super-light weight pneumatic tires sufficiently clearing the safety standard. The pneumatic tires according to the invention are particularly suitable for use in passenger cars and small-size trucks.

In addition, the pneumatic tires according to the invention can decrease the winding number of the cord by an increment of the critical inner pressure as compared with the conventional tire using the bead core made from organic fiber cord not appropriating the cord structure and hence the tire weight can be reduced and also the amount of high-strength fiber cord used, which is relatively high in the cost, can be decreased to attain the cost reduction.

What is claimed is:

1. In a pneumatic tire comprising a bead core formed by helically winding and spirally laminating an organic or inorganic fiber cord obtained by two or more twistings inclusive of a twisting of an organic or inorganic fiber reinforcing element comprised of a monofilament or a bundle of filaments in one direction and a twisting of at least two twisted fiber reinforcing elements in a direction opposite to the twisting direction of the fiber reinforcing element, an improvement wherein the cord is formed by successively conducting the twistings so that the twisting number in the last twisting is made larger than the twisting number in the initial twisting and the twisting directions from the initial twisting to the last twisting are made different to each other.

2. A pneumatic tire according to claim 1, wherein the fiber cord has a plied structure obtained by twisting the fiber reinforcing elements two times.

3. A pneumatic tire according to claim 1, wherein the bead core is formed by winding and spirally laminating a narrow-width rubberized sheet embedding a plurality of the fiber cords therein.

4. A pneumatic tire according to claim 1, wherein the bead core is formed by helically winding and spirally laminating a single fiber cord.

5. A pneumatic tire according to claim 1, wherein the fiber reinforcing element is a polyamide fiber.

* * * * *